(12) United States Patent
Dhand et al.

(10) Patent No.: US 11,989,620 B2
(45) Date of Patent: May 21, 2024

(54) MANAGEMENT OF POWER CONSUMPTION IN OPTICAL CIRCUITS FOR QUANTUM COMPUTING

(71) Applicant: Xanadu Quantum Technologies Inc., Toronto (CA)

(72) Inventors: Ish Dhand, Toronto (CA); Haoyu Qi, Toronto (CA); Leonhard Neuhaus, Munich (DE); Lukas Helt, Toronto (CA); Kamil Bradler, Toronto (CA); Zachary Vernon, Toronto (CA); Shreya Prasanna Kumar, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 900 days.

(21) Appl. No.: 17/034,050

(22) Filed: Sep. 28, 2020

(65) Prior Publication Data
US 2021/0097421 A1    Apr. 1, 2021

Related U.S. Application Data

(60) Provisional application No. 62/972,422, filed on Feb. 10, 2020, provisional application No. 62/906,455, filed on Sep. 26, 2019.

(51) Int. Cl.
*G06E 3/00* (2006.01)
*G06F 17/14* (2006.01)
(Continued)

(52) U.S. Cl.
CPC .............. *G06N 10/00* (2019.01); *G06E 3/008* (2013.01); *G06F 17/14* (2013.01); *G06N 3/126* (2013.01); *G06F 17/11* (2013.01)

(58) Field of Classification Search
CPC ........ G06N 10/00; G06N 3/126; G06E 3/008; G06F 17/14; G06F 17/11
(Continued)

(56) References Cited

U.S. PATENT DOCUMENTS

| 11,543,668 B2 | 1/2023 | Bradler et al. |
| 2014/0299743 A1 | 10/2014 | Miller |

(Continued)

OTHER PUBLICATIONS

Durstenfeld, Richard, "Algorithm 235: Random permutation". Communications of the ACM. Jul. 1, 1964; 7(7): 420-421.
(Continued)

*Primary Examiner* — John E Johansen
(74) *Attorney, Agent, or Firm* — COOLEY LLP

(57) ABSTRACT

A method includes calculating a plurality of permutation matrices of an input matrix that characterizes a linear transformation of a plurality of input states. The method also includes determining a plurality of settings of an optical circuit based on the plurality of permutation matrices. Each setting in the plurality of settings is associated with an electric power, from a plurality of electric powers, consumed by the optical circuit. The method also includes determining a selected setting of the optical circuit based on the electric power from the plurality of electric powers and consumed by the optical circuit at each setting from the plurality of settings associated with the electric power. The method further includes implementing the selected setting on the optical circuit to perform the linear transformation of the plurality of input states.

29 Claims, 12 Drawing Sheets

(51) Int. Cl.
*G06N 3/126* (2023.01)
*G06N 10/00* (2022.01)
*G06F 17/11* (2006.01)

(58) Field of Classification Search
USPC .............................................. 703/2
See application file for complete search history.

(56) References Cited

U.S. PATENT DOCUMENTS

2015/0354938 A1  12/2015  Mower et al.
2019/0086610 A1   3/2019  Clements et al.
2021/0096384 A1   4/2021  Bradler et al.

OTHER PUBLICATIONS

Okounkov, Andrei, "Random matrices and random permutations". Int. Math. Res. Notices (2000); No. 20, pp. 1043-1095, 53 pages.
Wilkes, "60.5 dB Silicon Mach-Zehnder Interferometer using Self-Optimising Beam-Splitters", Frontiers in Optics 2016, OSA Technical Digest (online), Optica Publishing Group (2016), 2 pages.

MANAGEMENT OF POWER CONSUMPTION IN OPTICAL CIRCUITS FOR QUANTUM COMPUTING

CROSS-REFERENCE TO RELATED APPLICATIONS

This application claims priority to and the benefit of U.S. Provisional Patent Application No. 62/972,422, filed Feb. 10, 2020 and titled "Management of Power Consumption in Optical Circuits for Quantum Computing," and also claims priority to and the benefit of U.S. Provisional Patent Application No. 62/906,455, filed Sep. 26, 2019 and titled "Methods and Apparatus for Mitigating Imperfections in Optical Circuits," the entire content of each of which is incorporated by reference herein in its entirety for all purposes.

FIELD

One or more embodiments relate to management of power consumption in optical circuits for quantum computing.

BACKGROUND

Integrated linear optical interferometers are widely used in performing linear transformations of optical modes. But it is challenging to scale these interferometers to transform a large number of input modes because of the high power consumption and considerable fluctuations in power consumption when implementing different transformations. For example, programmable linear optical interferometers can implement different unitary transformations using reconfigurable phase-shifters, which can be tuned by applying a voltage across an optical element based on thermo-electric or electro-optic phase manipulation. For a large-scale interferometer, the resulting power consumption can be significant.

In addition, the power consumption can also generate heat and therefore increase the temperature of the interferometer. Accordingly, the interferometer may operate at different temperatures when implementing different transformations. This temperature fluctuation may compromise the performance of the interferometer because optical elements in the interferometer are often sensitive to temperature. Furthermore, high power consumption or fluctuations in power consumption can also pose challenges for future applications of linear optical interferometers, such as the integration of on-chip detectors and cryogenic chips.

SUMMARY

Some embodiments described herein relate generally to management of power consumption in optical circuits, and, in particular, to reduce the power consumption or fluctuation of power consumption of optical circuits via permuted matrices. In some embodiments, a method includes calculating a plurality of permuted matrices of an input matrix that characterizes a linear transformation of a plurality of input states. The method also includes determining a plurality of settings of an optical circuit based on the plurality of permuted matrices. Each setting in the plurality of settings is associated with an electric power, from a plurality of electric powers, consumed by the optical circuit. The method also includes determining a selected setting of the optical circuit based on the electric power from the plurality of electric powers and consumed by the optical circuit at each setting from the plurality of settings associated with the electric power. The method further includes generating and sending a signal indicating an implementation of the selected setting on the optical circuit. The method optionally further includes implementing the selected setting on the optical circuit to perform the linear transformation of the plurality of input states.

In some embodiments, an apparatus includes an optical circuit configured in a selected setting to implement a linear transformation of a plurality of input states. The linear transformation is characterized by an initial matrix. The selected setting of the optical circuit is determined by a method that includes calculating a plurality of permuted matrices of the initial matrix and determining a plurality of settings of the optical circuit based on the plurality of permuted matrices. Each setting in the plurality of settings is associated with an electric power, from a plurality of electric powers, consumed by the optical circuit. The method also includes determining the selected setting of the optical circuit based on the electric power from the plurality of electric powers and consumed by the optical circuit at each setting from the plurality of settings associated with the electric power.

In some embodiments, an apparatus includes an optical circuit during a first time period configured to receive a plurality of inputs having a plurality of input states. The optical circuit during the first time period is configured to linearly transform the plurality of input states based on a selected setting of the optical circuit to produce a plurality of outputs. The linear transformation is characterized by an initial matrix. The selected setting of the optical circuit is based on an electric power from a plurality of electric powers consumed by the optical circuit during a second time period at each setting in a plurality of settings that are associated with a plurality of permuted matrices of the initial matrix. The second time period is before and mutually exclusive from the first time period.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter may be shown exaggerated or enlarged in the drawings to facilitate an understanding of different features. In the drawings, like reference characters generally refer to like features (e.g., functionally similar and/or structurally similar elements).

DETAILED DESCRIPTION

One or more methods, apparatus, and systems described herein employ an approach to manage power consumption of optical circuits via permuted matrices associated with the desired transformation. In this approach, for a given transformation associated with an initial matrix, multiple permuted matrices are calculated (via a process referred to herein as "permutation transformation") and the corresponding setting of the optical circuit to implement the transformation associated with each permuted matrix is determined. The setting that incurs the lowest power consumption (or a power consumption closest to a desired target power or power consumption within a predetermined target range) of the optical circuit can then be implemented. Since a permuted matrix of the initial matrix is calculated by permuting rows and/or columns of the initial matrix, the output of the permutation transformation can be transformed to the desired output (i.e., as if from the original transformation) by another permutation step. Therefore, the approach described herein can be used to realize a given transformation via its permutation transformation at a lower power consumption. In some embodiments, the approach described herein can also be used to reduce the fluctuation of power consumption for an optical circuit to implement different transformations that are not permutation transformations to each other. In these embodiments, for each transformation from a group of transformations, the power consumption can be brought within a predetermined range.

Figure 1A:
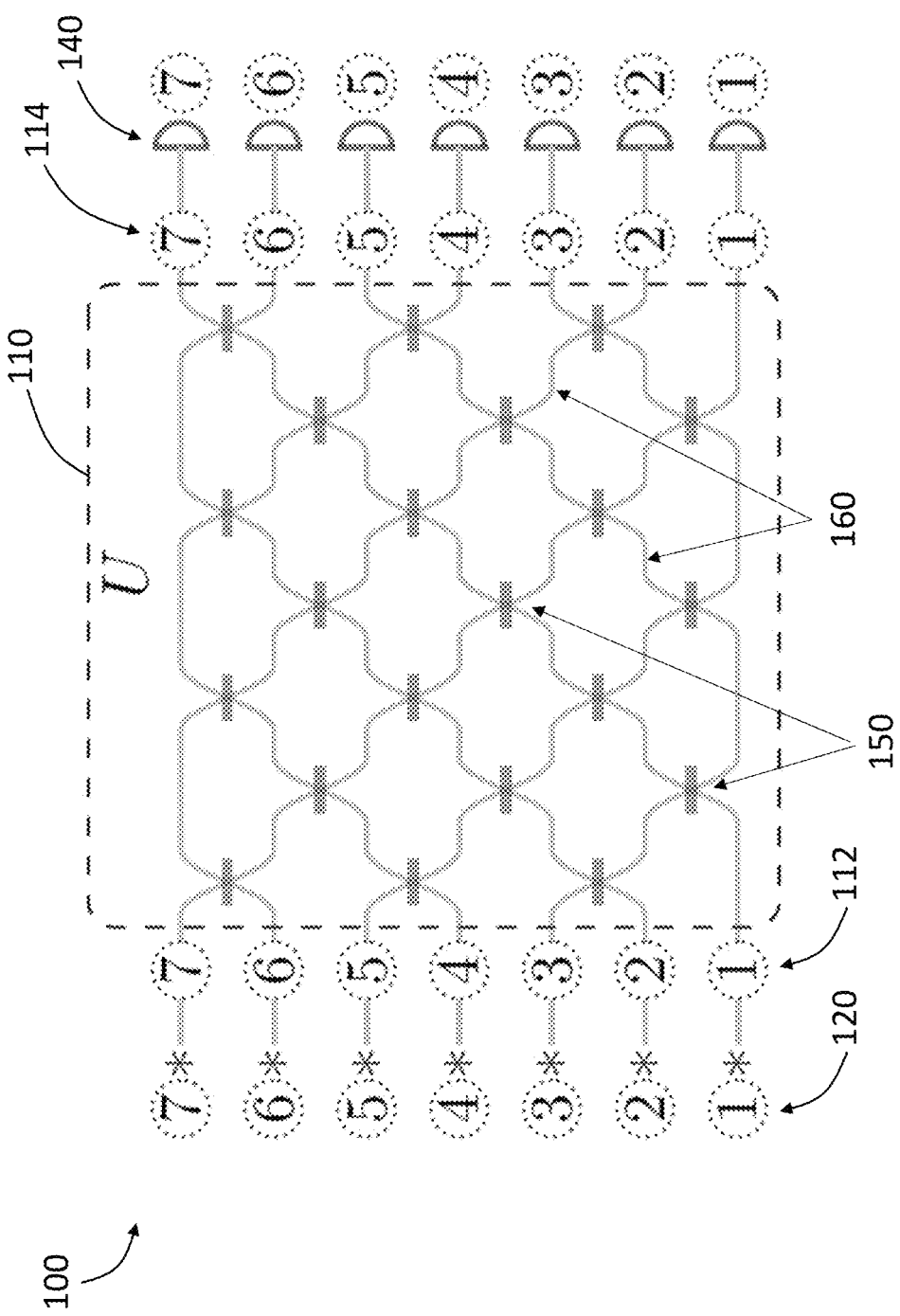
FIGS. 1A and 1B illustrate the management of power consumption of an optical circuit including reconfigurable beam splitters, according to an embodiment.
Figure 1B:
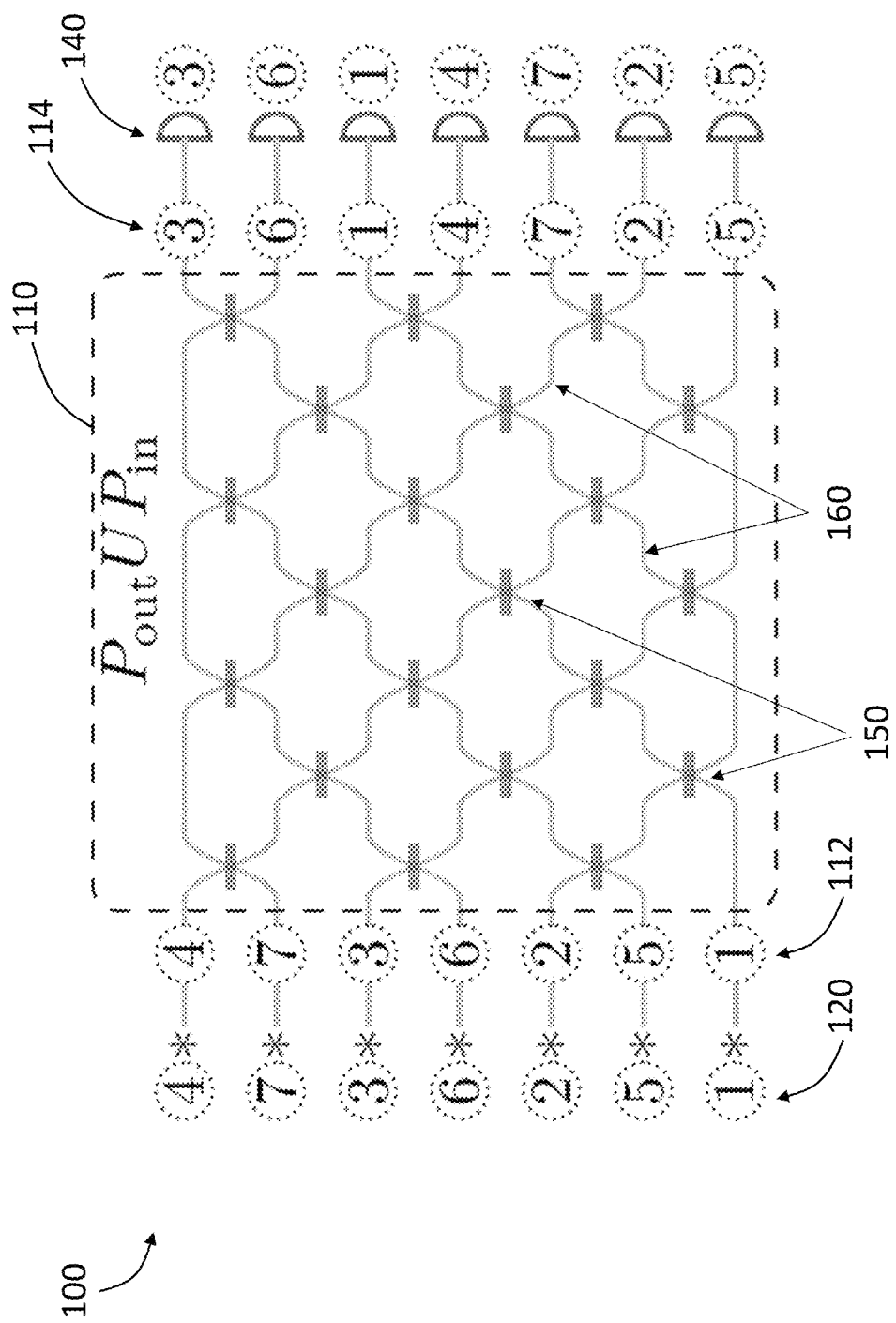

FIGS. 1A and 1B illustrate the management of power consumption of an optical circuit 100 including reconfigurable beam splitters, according to an embodiment. The optical circuit 100 includes a network 110 of interconnected reconfigurable beam splitters 150 (only two are labeled for illustrative purposes) coupled together by waveguides 160 (only two are labeled for illustrative purposes). The optical circuit 100 also includes input ports 112 and output ports 114. The input ports 112 are in optical communication with light sources 120 and the output ports are in optical communication with detectors 140.

Figure 1C:
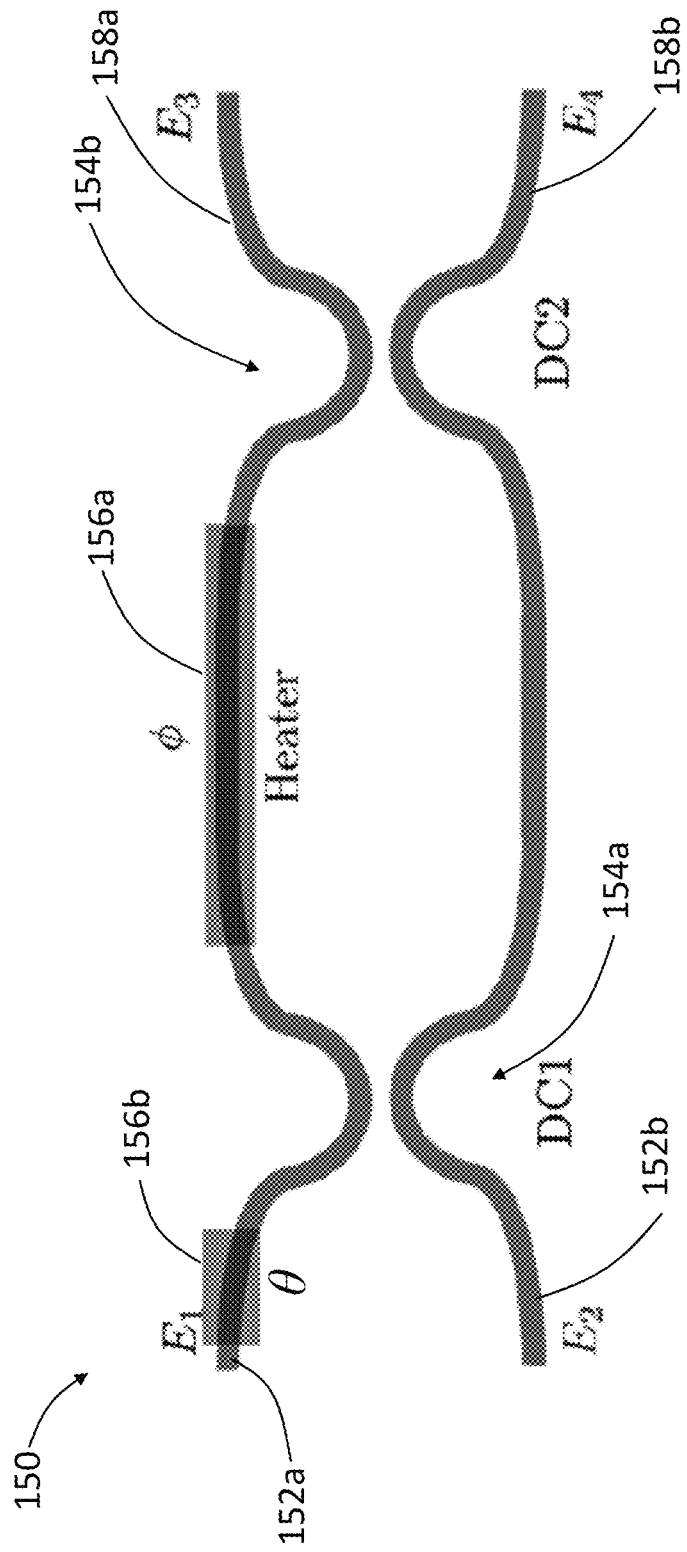
FIG. 1C shows a schematic of a reconfigurable beam splitter that can be used in the optical circuit illustrated in FIGS. 1A and 1B, according to an embodiment.

FIG. 1C shows a schematic of a reconfigurable beam splitter (RBS) 150 that can be used in the apparatus 100, according to an embodiment. The RBS 150 includes a first directional coupler (DC1) 154a and a second direction coupler (DC2) 154b placed sequentially, with the relative optical phase ϕ (implemented by a first phase shifter 156a) between the intervening waveguides. In some embodiments, the first phase shifter 156a can include a thermo-optical phase shifter that can apply different amounts of phase shift via the electric current through the phase shifter 156a. Other techniques of controlling this phase, such as electro-optic phase shifters, can also be used.

The RBS 150 also includes two input ports 152a and 152b, as well as two output ports 158a and 158b. In addition, a second phase shifter 156b is placed on one input 152a of the RBS 150. The two phase shifters 156a and 156b, via different phase settings, allow the RBS 150 to achieve an arbitrary splitting ratio, i.e., a tunable transmission between the input fields ($E_1$, $E_2$) and the output fields ($E_3$, $E_4$).

The power consumption of the apparatus 100 for implementing a transformation depends on the sum of power consumptions of each RBS 150, which in turn depend on the voltage (or electric current) applied on the phase shifters 156a and 156b. For different transformations, the applied voltages (or currents) are usually different, thereby resulting in different power consumptions.

FIG. 1A shows that the network 110 of interconnected reconfigurable beam splitters 150 is configured to implement a transformation characterized by a matrix U, and FIG. 1B shows that the network 110 of interconnected reconfigurable beam splitters 150 is configured to implement anew transformation characterized by a permuted matrix $P_{out}UP_{in}$ so as to reduce the power consumption. More specifically, the method to change the power consumption in implementing the given unitary transformation ("permuted matrix") U involves permuting the labels of its input ports 112 (using matrix $P_{in}$) and output ports 114 (using matrix $P_{out}$). The matrices $P_{in}$ and $P_{out}$ are also referred to as permutation matrices, which are obtained by permuting the rows of an identity matrix. Before permutation, the input ports 112 and the output ports 114 are labeled as 1 to 7 from bottom to the top as shown in FIG. 1A. After permutation, the input ports 112 have a different numbering, i.e., 1, 5, 2, 6, 3, 7, 4 from bottom to top, and the output ports 114 also have a different numbering, i.e., 5, 2, 7, 4, 1, 6, 3.

Different labeling (or numbering) of the input ports 112 and output ports 114 corresponds to different unitary transformations being implemented by the optical circuit 100. In other words, permuting the input ports 112 and output ports 114 is functionally equivalent to transforming the original unitary matrix U into $U'=P_{out}UP_{in}$, which is a permuted matrix of an initial matrix U (also referred to as an "input matrix" or a "starting matrix"). The setting of the network 110 to implement U' is usually different from the setting of the network 110 to implement U, thereby also resulting in a different power consumption. By examining the settings of multiple permuted matrices of the initial matrix U, one can therefore find out the setting associated with the lowest power consumption (or a power consumption closest to a desired target power or power consumption within a predetermined target range).

In some instances, permuting the labels of the input ports 112 may involve rearrangement of the light sources 120. Such rearrangement, however, can be conveniently achieved for optical circuits with integrated on-chip light sources. These circuits usually have multiple sources (e.g., an array of light sources as illustrated in FIGS. 1A and 1B) such that each input port from the input ports 112 can receive light from a corresponding light source from the light sources 120. The light emitted by such on-chip sources 120 can be permuted by permuting the control signals that drive these light sources 120 as specified by the user.

In some instances, permuting the labels of the output ports 114 can involve the permutation of the measurement results acquired by the detectors 140. In some embodiments, the measurement results of the detectors 140 can be numbered and stored by a classical control system, which can then permute the measured results so as to recover the desired outcome as if achieved from the original transformation U.

For an optical circuit having n input ports 112 and n output ports 114, where n is a positive integer, the total number of permutations for the input ports 112 is n! and the total number of permutations for the output ports 114 is also n!. Accordingly, the total number of combinations (i.e., the total number of different settings of the optical circuit 100) is (n!)². Out of these different settings, the setting associated with the lowest power consumption (or a power consumption closest to a desired target power or power consumption within a predetermined target range) can therefore be selected for implementation.

Figure 2:
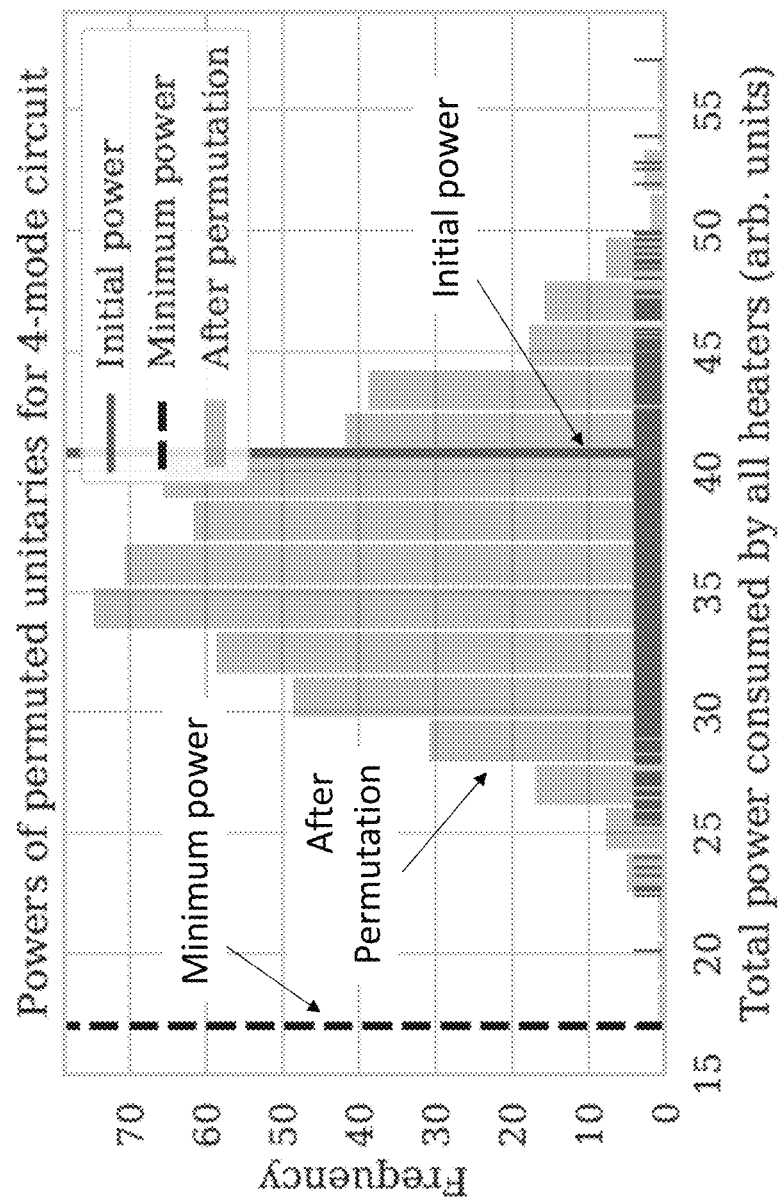
FIG. 2 shows power consumptions for an optical circuit to implement Gaussian Boson Sampling (GBS) with and without permutation, according to an embodiment.

FIG. 2 shows power consumptions for an optical circuit to implement Gaussian Boson Sampling (GBS) with and without permutations, according to an embodiment. The optical circuit can be substantially similar to the apparatus 100 shown in FIGS. 1A and 1B. For illustrative purposes, the example shown in FIG. 2 uses a four-mode circuit, i.e., the optical circuit has four input ports and four output ports. In this GBS implementation, the input received from the user includes a 4×4 unitary matrix U and four squeezing values $\{s_1, s_2, s_3, s_4\}$ specifying the state of the light sent to the four input ports. The setting of the optical circuit (e.g., the phases applied each phase shifter) to implement U is calculated using a decomposition of the unitary matrix into beamsplitters. The setting is then used to calculate the voltages that are applied to introduce the phases. In some embodiments, the quantitative relation between phases and voltages can be determined with a calibration procedure operated on the optical circuit.

In a known circuit implementing GBS without permutations described herein, squeezed light is sent into the optical circuit and the number of photons emitted from each output mode is recorded. More specifically, for one round of the transformation, squeezed light with squeezing values $\{s_1, s_2, s_3, s_4\}$ is created and sent into the optical circuit, where a set of n(n−1) voltages $\{v_1, v_2, v_3, \ldots v_{12}\}$ are applied to the phase shifters to implement the transformation U. The total power consumption of this interferometer is $P \propto \Sigma_i v_i^2$. The light emitted from the interferometer is measured at photon-number resolving (PNR) detectors (e.g., detectors 140 of FIGS. 1A and 1B), and the detected photon numbers are recorded as $\{n_1, n_2, n_3, n_4\}$.

To change the power consumption of the optical circuit, an input port permutation (via $P_{in}$) and an output port permutation (via $P_{out}$) are performed. It can be useful to characterize the permutations in matrix representation, i.e., multiplying a permutation matrix to the left side of a matrix leads to a reordering (i.e., permutation) of elements in the rows of the matrix, and multiplying a permutation matrix to the right while right side of the matrix permutes the columns of the matrix.

The new unitary transformation to be performed on the interferometer is $U'=P_{out}UP_{in}$. The action of the permutation matrices $P_{out}$ and $P_{in}$ leads to the columns of U being shuffled. For instance, consider an input permutation of the form:

$$P_{in} = \begin{pmatrix} 0 & 1 & 0 & 0 \\ 0 & 0 & 1 & 0 \\ 1 & 0 & 0 & 0 \\ 0 & 0 & 0 & 1 \end{pmatrix} \quad (1)$$

$P_{in}$ can be used to permute the first three indices and leaves the fourth index unchanged. Without loss of generality, the original matrix U can be written as:

$$U = \begin{pmatrix} U_{11} & U_{12} & U_{13} & U_{14} \\ U_{21} & U_{22} & U_{23} & U_{24} \\ U_{31} & U_{32} & U_{33} & U_{34} \\ U_{41} & U_{42} & U_{43} & U_{44} \end{pmatrix} \quad (2)$$

Therefore, multiplying Pin from the right side of the matrix can shuffle the columns to give a new unitary matrix:

$$\tilde{U} = UP_{in} = \begin{pmatrix} U_{12} & U_{13} & U_{11} & U_{14} \\ U_{22} & U_{23} & U_{21} & U_{24} \\ U_{32} & U_{33} & U_{31} & U_{34} \\ U_{42} & U_{43} & U_{41} & U_{44} \end{pmatrix} \quad (3)$$

Furthermore, assume that the output permutation is:

$$P_{out} = \begin{pmatrix} 1 & 0 & 0 & 0 \\ 0 & 1 & 0 & 0 \\ 0 & 0 & 0 & 1 \\ 0 & 0 & 1 & 0 \end{pmatrix} \quad (4)$$

$P_{out}$ leaves the first two indices unchanged and swaps the last two indices. The multiplication of this permutation with $\tilde{U}$ from the left gives the permuted matrix:

$$U' = P_{out}\tilde{U} = P_{out}UP_{in} = \begin{pmatrix} U_{12} & U_{13} & U_{11} & U_{14} \\ U_{22} & U_{23} & U_{21} & U_{24} \\ U_{42} & U_{43} & U_{41} & U_{44} \\ U_{32} & U_{33} & U_{31} & U_{34} \end{pmatrix} \quad (5)$$

Because permutations are also unitary transformations, it can be seen that the permuted matrix U' is also unitary.

The permuted unitary U' is usually implemented with different voltages applied to the phase shifters, thereby resulting in a different power consumption $P' \propto \Sigma_i (v')_i^2$. Permuting the input ports may involve permuting the light that is sent into the input ports, i.e., the four squeezers are tuned to provide squeezing $\{s_2, s_3, s_1, s_4\}$, respectively. Likewise, the output measurements are permuted as well before the results are returned to the user. Denote the output measurement (i.e., photon numbers at the PNRs) as $\{n'_1, n'_2, n'_3, n'_4\}$, then these photon numbers are permuted according to $P_{out}$ and the value returned to the user is $\{n'_1, n'_2, n'_4, n'_3\}$. From the perspective of the user, this complete procedure gives identical outcome probabilities as compared to the original GBS circuit implemented without permutation. But the power consumption of the permuted procedure can be lower or closer to a pre-determined target power.

In FIG. 2, a random unitary is drawn from the Haar measure as the input unitary. The power consumption associated with this input unitary is calculated assuming a linear relation between powers and phases with zero powers representing uniform random phases. The initial power consumption is depicted by the solid vertical line (labeled "Initial power" in FIG. 2). The power consumption associated with the permuted unitary matrices is represented by the short vertical lines at the bottom of the plot. The histogram depicts the distribution of these powers for the (4!)²=576 different pairs of input and output permutations. The vertical dashed line (labeled "minimum power" in FIG. 2) depicts the lowest among these power consumption values. It can be seen that the lowest power consumption can be about 40% of the initial power consumption.

In some embodiments, implementing GBS in an optical circuit can take advantage of an additional degree of freedom to further optimize the power consumption. More specifically, the input states in GBS are squeezed vacuum states, which are invariant under a phase change of $\pi$. Therefore, an additional phase of $\pi$ can be appended independently to each input port of the optical circuit without changing the output statistics obtained from the detection. This additional phase at an input port changes the phase value of the phase shifter at that input port and leaves the other parameters unchanged. Accordingly, the application of a $\pi$ phase changes one voltage value, thereby changing the power consumption of the optical circuit. This additional degree of freedom thereby provides $2^n$ different combinations of applying a $\pi$ phase shift or not at each of then input ports, and the total number of permutations is $2^n \times (n!)^2$.

The ability to change power consumption based on permuted matrices can be used for at least three applications. The first application is to lower the power consumption for an optical circuit to implement a transformation so as to, for example, facilitate the scaling of the optical circuit. In this application, different input and output permutations are examined repeatedly according to methods and protocols described in more details below. After searching through these permutations, the input and output permutations that lead to lowest power consumption are selected. In some embodiments, a threshold value of the power consumption can be predetermined. In these embodiments, the search can stop as soon as a permutation that can lead to an acceptable power consumption is found.

A second application is to obtain power consumption values close to a target power value. A target power value may be chosen close to the power value that was used to calibrate the interferometer. Using power consumption values close to this value can improve the fidelities of the unitary being implemented on the interferometer. In this application, different input and output permutations are examined repeatedly according to methods and protocols described in further detail below. After searching through these permutations, the input and output permutations that lead to power consumption values closest to the target power are selected. In some embodiments, a threshold value of the difference between the power consumption and the target power can be predetermined. In such embodiments, the search can terminate as soon as a permutation that can lead to an acceptable power consumption is found.

Figure 8:
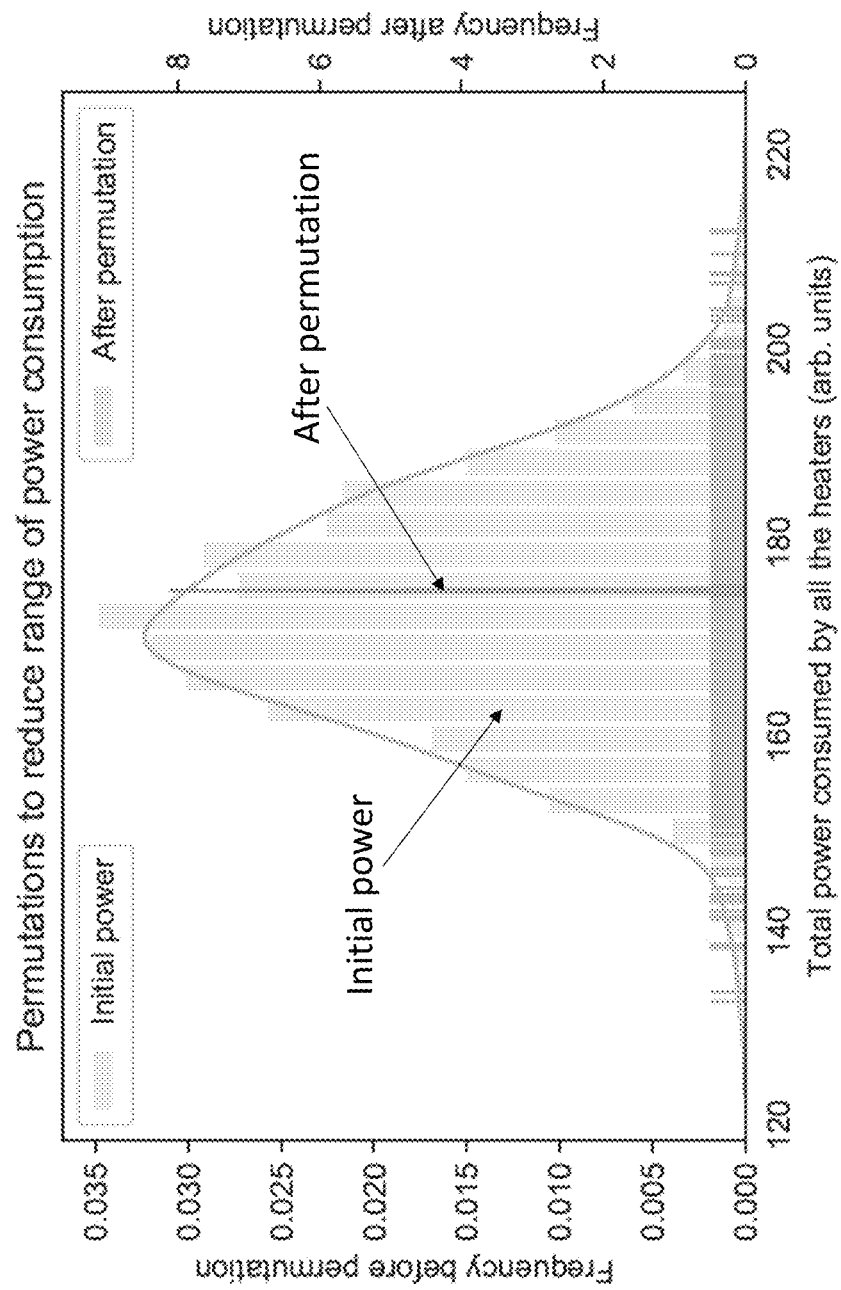
FIGS. 8 and 9 show a zoomed-out view and a zoomed-in view, respectively, of example simulation results, based on an eight-mode optical circuit, demonstrating an improvement to power range using permuted matrices.
Figure 9:
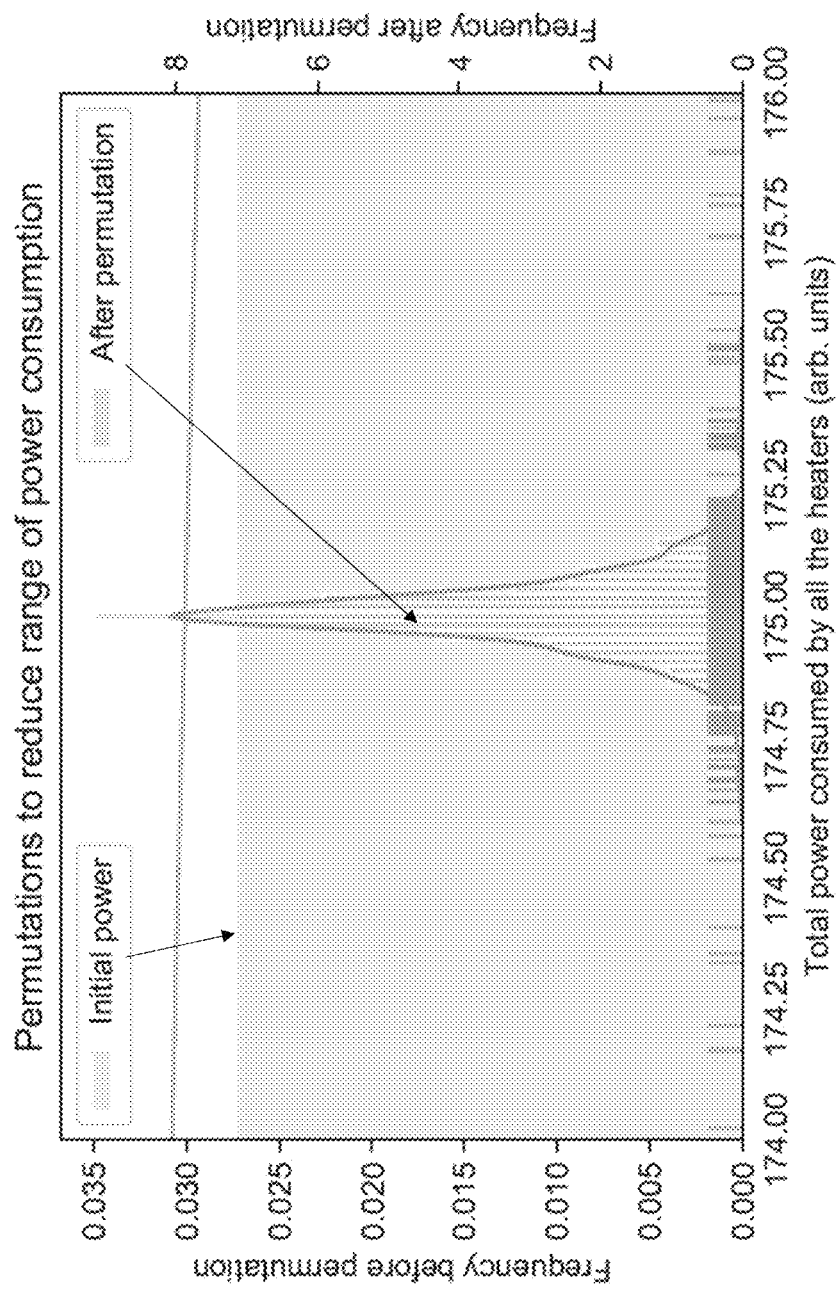

The third application is to reduce the fluctuation of power consumption for the optical circuit to implement multiple transformations, thereby maintaining a stable operating temperature of the optical circuit. For this application, the power minimization method described herein can be used as a subroutine. A first approach to reduce the fluctuation of power consumptions is to find a range of power consumption values such that the power consumption of any unitary transformation can be brought to within this range. A second approach is to perform simulations on a computer to determine the distribution of power consumption values for a large number of random unitaries of a desired size. The mean of these power consumption values can be chosen as a target power. Next, a search is performed to identify permutations that reduce the difference between the power consumption after permutation and the target power. FIGS. 8 and 9 show a zoomed-out view and a zoomed-in view, respectively, of example simulation results (based on an eight-mode optical circuit) that demonstrate the improvement of the power range resulting from the second approach.

Another method of finding such a suitable range can begin with choosing many unitary matrices, also referred to as trial matrices. In some embodiments, these matrices can be produced by sampling uniformly from the Haar measure. In some embodiments, the total number of these matrices can be about 1,000 to about 100,000 for an optical circuit having 4 and 20 input ports, respectively. For each trial matrix, the power consumption to implement the associated trial transformation can be reduced by searching over multiple permuted matrices of the trial matrix using methods described herein. In other words, each trial matrix has an associated minimum power consumption, also referred to as a local minimum power consumption. The collection of these local minimum power consumptions forms a range (or a distribution), which is usually smaller than the range of the original power distributions.

In some embodiments, the range of local minimum power consumptions can be further narrowed as follows. The highest value of the range, denoted as $\mathcal{P}_{max}$, can be fixed and the method described herein is to find out the lower bound $\mathcal{P}_{min}$ that is as close to $\mathcal{P}_{max}$ as possible such that the range between $\mathcal{P}_{max}$ and $\mathcal{P}_{min}$ is small.

A suitable value of $\mathcal{P}_{min}$ can be found iteratively. First, $\mathcal{P}_{min}$ is set equal to the lowest value of the distribution of local minimum power consumptions. This value is then increased in small increments (e.g., between about 1% to about 5% of the range) from $\mathcal{P}_{min}$ to $\mathcal{P}_{min, try}$. At this stage, the permutations of each trial matrix are examined again to determine whether every trial matrix can have an associated power consumption between $\mathcal{P}_{min, try}$ and $\mathcal{P}_{max}$. If so, $\mathcal{P}_{min, try}$ is accepted as a new $\mathcal{P}_{min}$, which is then increased incrementally again for next iteration. In the event that the power consumption of at least one trial matrix cannot be made higher than the $\mathcal{P}_{min, try}$, then the current $\mathcal{P}_{min}$ value is set as the final value for the range.

Given the large number of trial matrices used in determining the range, it is expected that the power consumption of most unitary transformations (i.e., actual unitary transformations beyond the trial transformations that are used to find out this range) can be brought into this range by searching over permutations. If, however, a unitary matrix is found such that its power consumption cannot be brought into the desired range, i.e., if the power consumption after permutation is too high or too low, then the value of $\mathcal{P}_{max}$ and/or $\mathcal{P}_{min}$ can be adjusted to account for this unitary.

In some embodiments, the range of local minimum power consumptions can be further narrowed using another method. The method includes creating a test set of unitary matrices (i.e., trial matrices) by, e.g., sampling uniformly from the Haar measure. Then the initial power consumptions associated with all trial matrices are calculated without permutation.

Out of the initial power consumption, the highest power consumption and the associated trial matrix (now referred to as a working matrix) are identified. Permutations are then performed with respect to this working matrix to reduce the power consumption such that the reduced power consumption is no longer the highest power consumption in the initial power consumptions. This step is also referred to as the step of reducing the maximum power consumption. The step of reducing the maximum power consumption can be repeated (now the highest power consumption is associated with another trial matrix) multiple times to narrow the range of power consumptions.

In some embodiments, the method can be performed by identifying the lowest power consumption and the associated trial matrix (also referred to as a working matrix). Permutations are then performed with respect to this working matrix to increase the power consumption such that the increased power consumption is no longer the lowest power consumption in the initial power consumptions. This step is also referred to as the step of increasing the minimum power consumption. The step of increasing the minimum power consumption can be repeated multiple times to narrow the range of power consumptions.

In some embodiments, the method can include a combination of the step of reducing the maximum power consumption and the step of increasing the minimum power consumption. In some embodiments, the step of reducing the maximum power consumption and the step of increasing the minimum power consumption can be performed in an alternating manner, i.e., one step of reducing the maximum power consumption followed by one step of increasing the minimum power consumption.

In some embodiments, the method can be terminated when all possible permutations of the two trial matrices associated with the largest and smallest power consumption do not result in any further reduction of the range. In some embodiments, the method can be terminated when the resulting range of power consumptions is within a specified range (e.g., a predetermined range).

The speed of convergence in the methods of finding the desired range of power consumptions can be improved by one or more of the following techniques. In some embodiments, the step of increasing the minimum power consumption or reducing the maximum power consumption can be performed such that the next iteration does not work on the same trial matrix. In other words, the amount of change in the power consumption in the step of increasing the minimum power consumption or reducing the maximum power consumption is large enough that the next working matrix is different from the current working matrix.

In some embodiments, in each iteration of reducing the maximum power consumption or increasing the minimum power consumption, a predetermined number of permutations are performed and the permutation that results in the largest amount of change in the power consumption is selected. This technique can also incur a computational benefit(s) when multiple permutations can be calculated simultaneously (e.g., via parallel computing technology).

In some embodiments, the methods of determining the range of power consumptions can include parallelizing the search by working from both maximum power and minimum power ends simultaneously. In other words, some methods include simultaneously performing the step of increasing the minimum power consumption and the step of reducing the maximum power consumption so that the two searches meet in between.

In some embodiments, the methods include paralleling the search by calculating permutations of more than one trial matrices at the same time (e.g., having n working matrices simultaneously, where n is positive integer). In these embodiments, the goal of the permutations for each working matrix is to increase the associated power consumption above the n-th smallest power consumption or decrease the associated power consumption below the n-th largest power consumption in the initial power consumptions.

In some embodiments, the methods can include modifying the termination criterion such that the methods are terminated when the change of power consumption for the step of increasing the minimum power consumption or the step of reducing the maximum power consumption is less than a threshold value.

In some embodiments, the methods can be configured to identify the smallest power consumption range around a given target value. In these embodiments, the iteration can start with the power consumption that is furthest away from the target value of power consumption and include repeated steps of decreasing the maximum power consumption and/or increasing the minimum power consumption.

As described herein, the methods of finding out the lowest power consumption or the desired range of power consumptions include searching over multiple permutations. The efficiency of such a search can be improved by one or more of the following techniques.

In some embodiments, the optical circuit has a relatively small number of input/output ports (e.g., six or less), and the search over the permutations can be performed using a brute force technique over all possible permutations. In these embodiments, all permutations of the initial matrix can be examined to find the suitable permuted matrix (and accordingly the suitable pairs of input and output permutations). For example, for the application of reducing power consumptions, the permuted matrix that is associated with the lowest power consumption can be selected. For the application of reducing the fluctuation of power consumptions, the permutation that is associated with a power consumption within the desired range can be selected.

In some embodiments, the search can be performed using a random search method. In some embodiments, this random search method can be used for optical circuits having 20 or less input/output ports. In this random search method, permuted matrices are generated in a random manner until a permuted matrix that satisfies a predetermined criterion is detected. In some embodiments, the random search can use the Fisher-Yates shuffle technique. More information about the Fisher-Yates technique can be found in, for example, Richard Durstenfeld, Algorithm 235: Random permutation, *Commun. ACM*, Vol. 7, 420 (1964), and Andrei Okounkov, Random matrices and random permutations, *Int. Math. Res. Notices*, Vol. 2000, 1043-1095 (2000), each of which is incorporated herein in its entirety.

In some embodiments, the random search method can be terminated when a suitable permutation is detected. In some embodiments, the random search method can be terminated after a predetermined number of permuted matrices are examined. In some embodiments, the random search method can be performed in parallel, i.e., multiple permuted matrices can be generated and examined concurrently.

In some embodiments, the search can be performed using a fast search method. In some embodiments, this fast search method can be implemented for optical circuits having about 10 to about 100 input/output ports. The fast search method searches non-trivial permutations over trivial permutations to improve the search efficiency. Generally, any given permutation can be decomposed into binary permutations between two input ports or two output ports, and a given binary permutation is either a trivial permutation or a non-trivial permutation.

As used herein, the terms of trivial permutation and non-trivial permutation can be defined as follows. Consider nearest neighbor transpositions, which are permutations that swap two neighboring modes, e.g., i-th and (i+1)-th mode. Also consider the action of this permutation on the input ports of an optical circuit. If the first layer of beam splitters in the optical circuit includes a beam splitter that acts on these two modes, then the permutation only changes the phase of this single beam splitter, and the rest of the optical circuit is left unchanged. This is an example of a trivial permutation, and all the input transpositions swapping modes i and i+1 with i being an odd number are trivial, and so are their compositions (i.e., two consecutive permutations following each other). Trivial permutations also include output port transpositions if the total number of modes is odd. If the number of modes is even, then the output port transpositions are trivial when i is even. The remaining nearest neighbor transpositions are all non-trivial permutations, i.e., transpositions that relabel ports connected to different beam splitters have a nontrivial action on all the phases. All compositions of a non-trivial transposition are also non-trivial. Trivial permutations can be applied in any order among themselves, and non-trivial permutations can also be applied in any order among themselves.

The fast search method first searches over all nontrivial permutations of a given unitary for the one non-trivial permutation that minimizes power consumption. Once such a non-trivial permutation is found, then this permuted unitary is the starting point of the next step, in which all trivial permutations are searched over to find the one that minimizes the power consumption. In some embodiments, multiple repetitions of this combination of non-trivial and trivial searches can be performed to improve the search result. In some embodiments, the repetitions can be stopped once the constraints are met, e.g., when a low enough power is achieved, a power in the desired range is obtained, or a maximum computation time is exceeded.

The fast search method scales at least as fast as $k2^n$, where k is the number of repetitions performed and $2^{n/2}$ is the number of trivial or purely non-trivial permutations acting purely on input ports or output ports. Therefore, for a constant value of k, the scaling of this method can be significantly faster than the scaling of the brute-force search.

Figure 3:
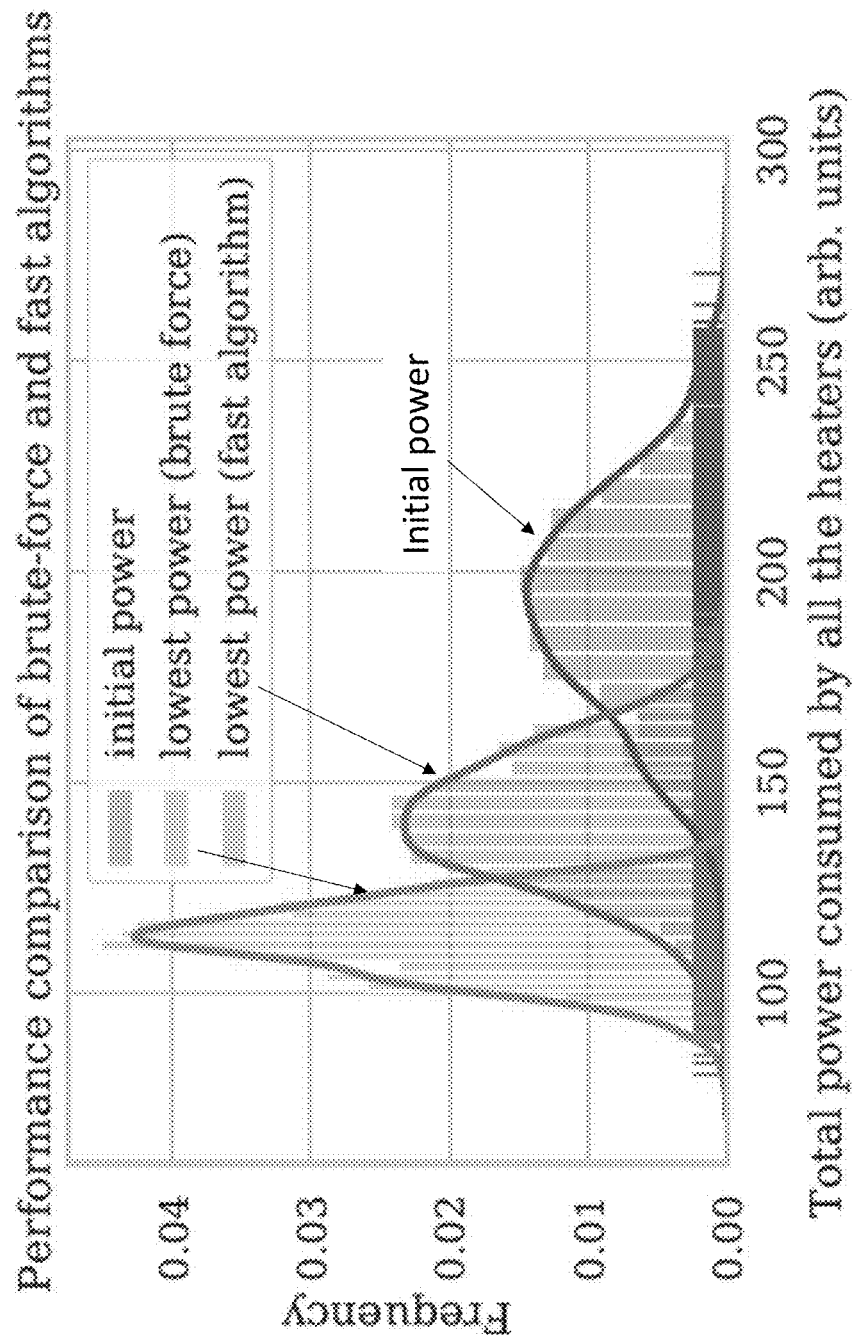
FIG. 3 shows performance comparison of brute force search and fast search for a four-mode optical circuit, according to an embodiment.

FIG. 3 shows an example of performance comparisons of brute force search and fast search for a four-mode optical circuit, according to an embodiment. To achieve the results, 1100 random unitary matrices were drawn from the Haar measure. A histogram of the initial power consumption values before permutation (labeled "Initial power" in FIG. 3) is presented as reference. The lowest power of each unitary matrix after permutation is calculated using the brute-force search and the fast search method (with k=2). The thick curved lines are the corresponding Gaussian kernel density estimates of the distributions. It can be seen that the brute force method results in a distribution that has a lower central value and also a narrower width. The fast search method can also reduce the average power consumption and the fluctuation of power consumption (as compared to the initial power distribution). The fast search method can be used, e.g., when the computing time is a major factor in operation.

In some embodiments, the search can be performed using a unitary-tailored method, which is based on the fact that for some unitary matrices, only a small number of heaters consume a significant portion of the power. If the initial unitary matrix falls into this category, then the unitary-tailored method includes changing the power consumption of these few heaters. This can be accomplished by repeatedly finding the heater that consumes the most power, followed by performing single nontrivial permutations that modify that specific heater as well as other heaters that are on a diagonal path containing the permuted port and the heater.

In some embodiments, the search can be performed using genetic algorithms. The task of the search described herein is to find the input and output permutations which (combined together) lead to a gate decomposition with minimum energy consumption. For illustrative purposes, a slightly simplified problem can be used to analyze the energy consumption over all input permutations.

Without loss of generality, each permutation of the input ports can be represented as $s=(s_1, s_2, \ldots s_n)$ with $s_j \in \{1, 2, \ldots, n\}$ and $s_i \neq s_j$ for $i \neq j$. Consequently, each set can be understood as a Hamiltonian path on a complete graph with n nodes. Each path from these paths is obtained by connecting the node $s_j$ and the node $s_{j+1}$ for $1 \leq j \leq n$.

Figure 4:
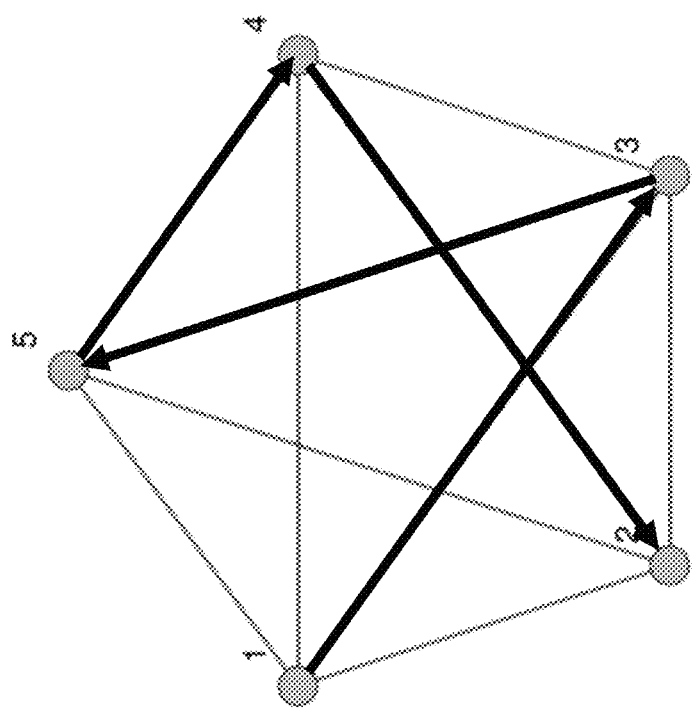
FIG. 4 shows a Hamiltonian path in a five-node graph that can be used for determining the permuted matrix associated with a minimum power consumption, according to an embodiment.

FIG. 4 shows a Hamiltonian path in a five-node graph that can be used for determining the permuted matrix associated with a minimum power consumption, according to an embodiment. Therefore, the problem of searching for the lowest power consumption can be recast into the following: to find the Hamilontian path S on a n-node complete graph such that P(s) is minimized. This reduced problem can be analogous to the Traveling Salesman Problem (TSP), which is to find the Hamiltonian path with minimum distance. From the optimization point of view, the problem of finding the lowest power consumption can be understood as a TSP problem with a different distance function.

In the genetic algorithms, both input and output permutations are equally useful. As a consequence, the algorithms have two independent populations, in the sense that the two populations can reproduce and mutate independently. The fitness function, however, depends on both populations in a non-trivial way. Therefore, the problem of finding the lowest power consumption resembles a symbiosis process: two different species evolve collaboratively toward a common purpose.

Without being bound by any particular theory of mode of operation, a genetic algorithm includes a population $\{(s_i, s_o)\}$, a crossover operator, a mutation operator, and a fitness function. Based on the discussion above, it can helpful for the operator $\mathcal{O}$ to satisfy the following two constraints: (1) it acts independently on the two populations, i.e., $\mathcal{O}((s_i, s_o))=(\mathcal{O}(s_i), \mathcal{O}(s_o))$; and (2) both $\mathcal{O}(s_i)$ and $\mathcal{O}(s_o)$ do not have repeated elements.

Figure 5:
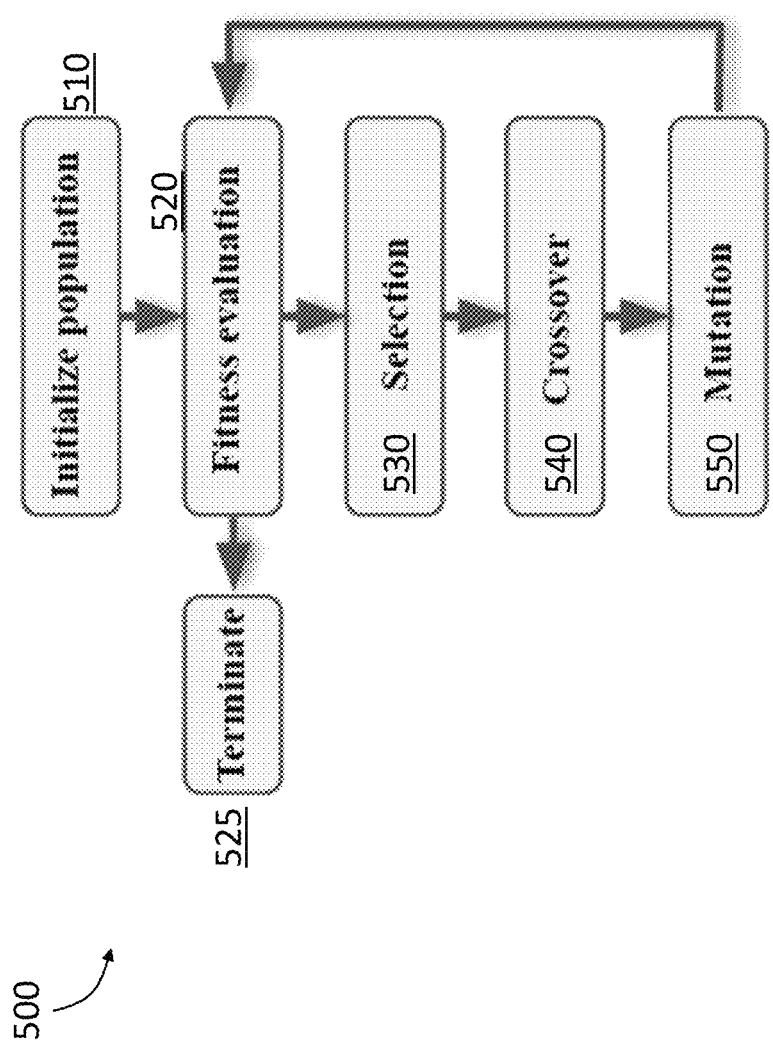
FIG. 5 shows a structure of a genetic algorithm that can be used to search for the lowest power consumption associated with permuted matrices, according to an embodiment.

FIG. 5 shows a structure of a genetic algorithm 500 that can be used to search for the lowest power consumption associated with permuted matrices, according to an embodiment. The genetic algorithm 500 includes initialization of population 510, where each individual is represented by an integer vector, i.e., a junction of two sub-individuals $(s_i, s_o)$. Each sub individual has a length n and has no repeat elements. The genetic algorithm 500 also includes a fitness evaluation 520, where the fitness function is given by the voltage function $P(s_i, s_o)$. The voltage function is the result of the gate decomposition of the permuted unitary matrix. The fitness of each individual is calculated.

A selection step is performed at 530. At this step, although there are several different ways to select two parents to reproduce, the basic idea behind them can be the same, i.e., the probability of choosing an individual is proportional to the fitness score. This can guarantee that the genetic advantage is passed over to the next generation. The genetic algorithm 500 also includes a crossover step at 540. A legal crossover operator can ensure that it will not generate repeated elements in the offspring. Various crossover operators can satisfy such a constraint, including a partially mapped crossover operator, an order crossover operator, and a cycle crossover operator, among others.

For illustrative purposes, a specific example of a partially mapped crossover operator for n=8 is described here. The basic idea is to choose a random middle section of two individuals as a mapping rule to exchange elements between them. Consider:

$$s_i^1 = (1\ 5\ 7|2\ 4\ 8|3\ 6) \quad (6)$$

$$s_i^2 = (5\ 2\ 6|8\ 3\ 7|1\ 4) \quad (7)$$

where | . . . | represent two randomly chosen cut points.

The middle portion generates a mapping rule 2←→8; 4←→3; 8←→7. And it generates the following two offspring:

$$o_i^1 = (1\ 5\ 2|8\ 3\ 7|4\ 6) \quad (8)$$

$$o_i^2 = (5\ 7\ 6|2\ 4\ 8|1\ 3) \quad (9)$$

The same procedure is applied to parents $s_o^1$ and $s_o^2$ independently. This process is repeated many times until a new population is produced.

At 550, each individual in the new population is allowed to mutate with a low probability, i.e., to avoid the optimization being trapped at a local minimum. In some embodiments, the mutation can be performed by swapping the elements at two randomly chosen locations. For example:

$$s_i = (1\ \underline{5}\ 7\ 2\ 4\ \underline{8}\ 3\ 6) \quad (10)$$

$$s_o = (1\ 8\ 7\ 2\ 4\ 5\ 3\ 6) \quad (11)$$

The whole process is repeated many times until the best fitness score converges.

After the mutation 550, the genetic algorithm 500 returns to step 520, where the fitness function is evaluated again for the offspring. The genetic algorithm 500 can be terminated when the fitness score satisfies a predetermined criterion.

Figure 6:
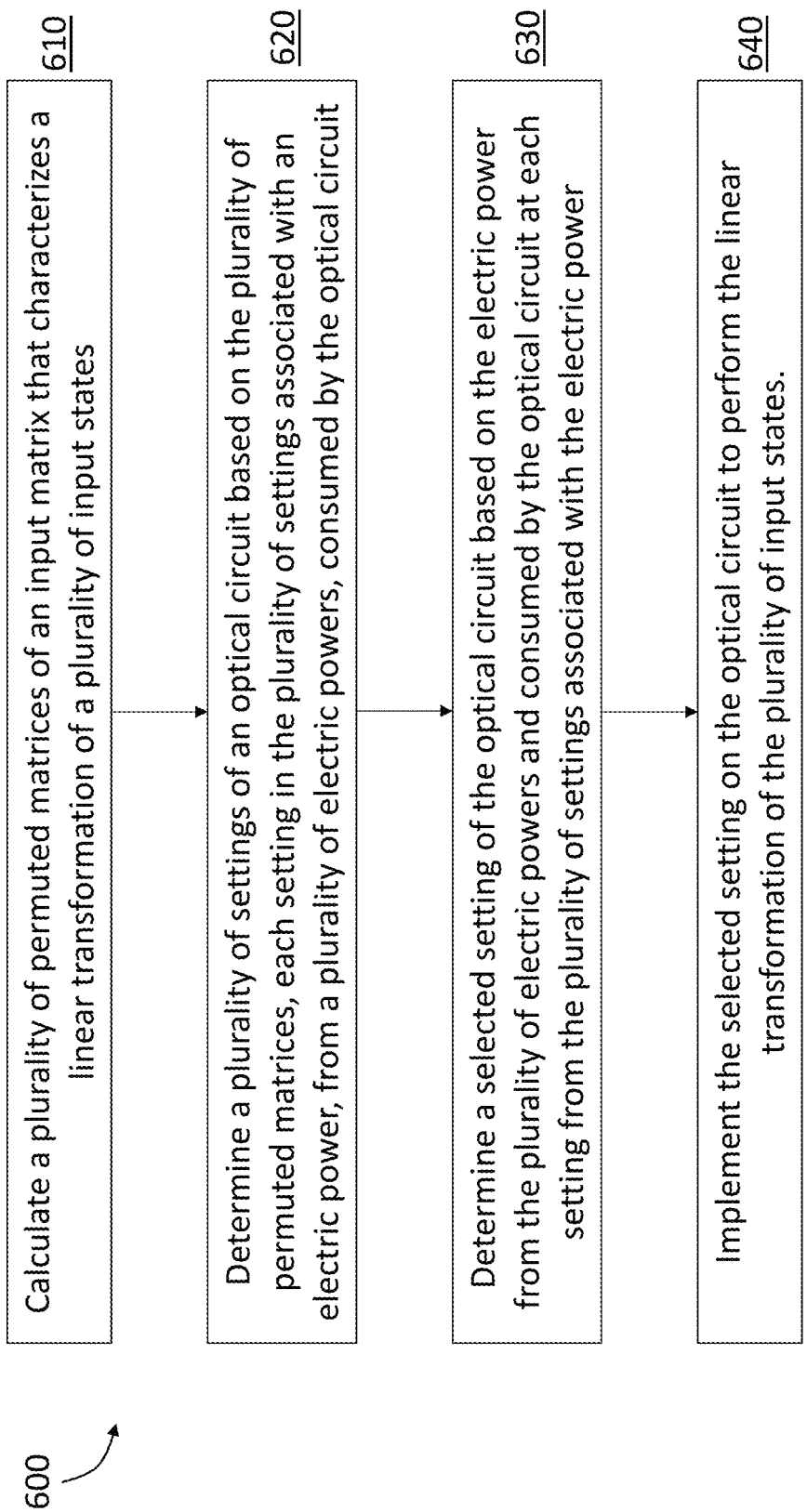
FIG. 6 is a flowchart illustrating a method of managing power consumptions of optical circuits, according to an embodiment.

FIG. 6 is a flowchart illustrating a method 600 of managing the power consumption of an optical circuit, according to an embodiment. The method 600 includes, at 610, calculating a plurality of permuted matrices of an initial matrix that characterizes a linear transformation of a plurality of input states. At 620, a plurality of settings of an optical circuit is determined based on the plurality of permuted matrices. Each setting in the plurality of settings is associated with an electric power, from a plurality of electric powers, consumed by the optical circuit.

The method 600 also includes, at 630, determining a selected setting of the optical circuit based on the electric power from the plurality of electric powers and consumed by the optical circuit at each setting from the plurality of settings associated with the electric power. At 640, the selected setting is implemented on the optical circuit to perform the linear transformation of the plurality of input states.

In some embodiments, the initial matrix includes a unitary matrix. In some embodiments, the initial matrix includes a non-unitary matrix. In these embodiments, the initial matrix can be decomposed into constituent unitary matrices (e.g., using SVD decomposition) and one or more simple matrices (e.g., diagonal matrices). The transformations associated with the constituent unitary matrices can then be implemented using the permutation approach described herein.

In some embodiments, the selected setting of the optical circuit is associated with an electric power that is lowest among the plurality of electric powers consumed by the optical circuit at the plurality of settings. In other words, the method 600 is configured to find out the lowest power consumption of the optical circuit to implement the linear transformation. In some embodiments, the selected setting of the optical circuit is associated with an electric power within a predetermined range of electric powers. In some embodiments, the method 600 can be configured to identify a range of power consumptions for multiple initial matrices.

In some embodiments, the multiple permuted matrices are generated using a brute force method. In these embodiments, the input states typically include, for example, six or less input states and calculating the plurality of permuted matrices includes calculating all possible permutations of the initial matrix to generate the plurality of permuted matrices.

In some embodiments, the multiple permuted matrices are generated using a random search method. In these embodiments, the input states typically include, for example, 20 or less input states and calculating the plurality of permuted matrices includes calculating a plurality of random permutations of the initial matrix to generate the plurality of permuted matrices. The plurality of random permutations typically includes, for example, about 10,000 random permutations to about 100,000 random permutations.

In some embodiments, the permuted matrices are generated using a fast search method. In these embodiments, calculating the plurality of permuted matrices includes calculating a first plurality of permuted matrices corresponding to non-trivial permutations of the initial matrix. An intermediate matrix from the first plurality of permuted matrices is determined based on electric powers consumed by the optical circuit at a first plurality of settings associated with the first plurality of permuted matrices. The method 600 also includes calculating a second plurality of permuted matrices corresponding to trivial permutations of the intermediate matrix and determining the selected setting of the optical circuit based on electric powers consumed by the optical circuit at a second plurality of settings associated with the second plurality of permuted matrices. In some embodiments, calculating the plurality of permuted matrices includes calculating the plurality of matrices based on a genetic algorithm.

In some embodiments, the linear transformation of the plurality of input states includes Gaussian Boson Sampling (GBS) of the plurality of input states. In some embodiments, the linear transformation of the plurality of input states includes Boson Sampling. In some embodiments, the method 600 can be used for optical circuits including optical switches and/or routers. In some embodiments, the method 600 can be used for optical based neural networks.

In some embodiments, the method 600 can be used in conjunction with a method of mitigating imperfections in optical circuits. More specifically, both the method 600 of managing power consumptions and the method of mitigating imperfections involve permuting the input and output port labels of optical circuits. In some embodiments, the search performed in the method 600 can include an additional constraint such that those permutations that may not be implemented on an imperfect optical circuit are rejected (e.g., before even examining the power consumption values). Therefore, the method 600 allows management of power consumptions on imperfect optical circuits as well. Additional details regarding mitigating imperfections in optical circuits are discussed in U.S. Provisional Patent Application No. 62/972,422, filed Feb. 10, 2020 and titled "Management of Power Consumption in Optical Circuits for Quantum Computing," the content of which is incorporated herein by reference in its entirety for all purposes, and in the "Mitigating Imperfections" section below.

Figure 7:
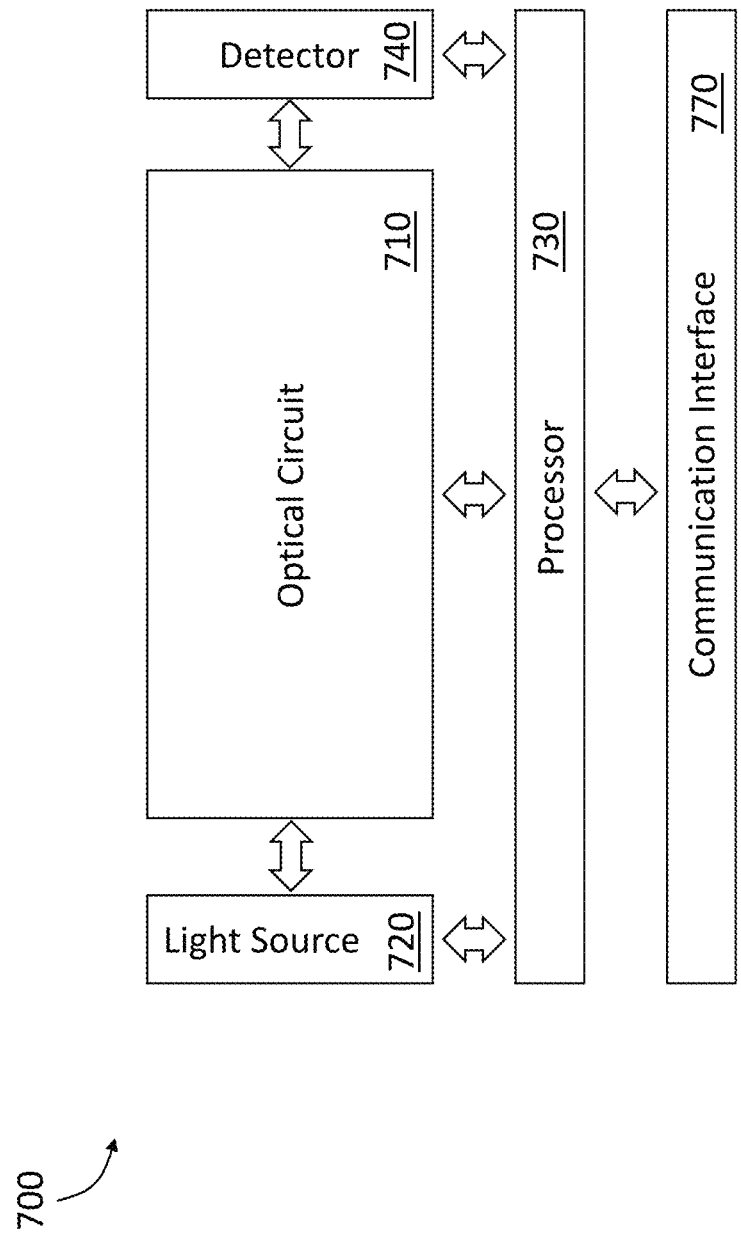
FIG. 7 shows a schematic of a system for managing power consumption of optical circuits, according to an embodiment.

FIG. 7 shows a schematic of a system 700 for managing power consumption of optical circuits, according to an embodiment. The system 700 includes an optical circuit 710 operatively coupled to a light source 720 and a detector 740. The optical circuit 710 is configured to receive input optical modes from the light source 720 and generate transformations of the input optical modes that are detected by the detector 740. The optical circuit 710, the light source 720, and the detector 740 are operatively coupled to a processor 730, which in turn is operatively coupled to a communication interface 770. The processor 730 can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. The communication interface 770 is configured to receive input from a user and/or present results achieved by the optical circuit 710 to the user for example via a communication device such as a desktop computer, mobile phone, etc. (not shown).

In some embodiments, the optical circuit 710 includes a network of interconnected reconfigurable beam splitters (see, e.g., FIGS. 1A and 1B) and each reconfigurable beam splitter in the network of interconnected reconfigurable beam splitters includes at least one variable phase shifter. In some embodiments, the optical circuit 710 includes at least one ring resonator and a coupler configured to couple at least one input state in the plurality of input states into the ring resonator at a variable coupling ratio. In some embodiments, the optical circuit 710 includes at least one micro-electromechanical system (MEMS) element. The optical circuit 710 can include any other type of elements that may consume electric power.

In some embodiments, setting of the optical circuit 710 is determined by the method 600 or any other method of managing power consumptions described herein. At this setting, the optical circuit 710 can implement a given linear transformation at a much lower power consumption (e.g., 40% or less) compared with settings that are not determined based on the permutations of the initial matrix.

In some embodiments, the optical circuit 710, during a first time period, is configured to receive a plurality of inputs having a plurality of input states (e.g., from the light source 720). The optical circuit during the first time period is configured to linearly transform the plurality of input states based on a selected setting of the optical circuit 710 to produce a plurality of outputs. The linear transformation is characterized by an initial matrix. In addition, the selected setting of the optical circuit 710 is based on an electric power from a plurality of electric powers consumed by the optical circuit 710 during a second time period at each setting in a plurality of settings that are associated with a plurality of permuted matrices of the initial matrix. The second time period is before and mutually exclusive from the first time period. In some embodiments, during the second time period, the electric powers consumed by the optical circuit 710 are determined based on simulation (e.g., calculation) and the optical circuit 710 is not actually configured in the settings associated with the permuted matrices of the initial matrix.

In some embodiments, the communication interface 770 is configured to receive an initial matrix from a user via a user device. The processor 730 is configured to implement the method 600 or any other method of managing power consumptions described herein so as to identify the setting of the optical circuit 710. The processor 730 can also be configured to implement the determined setting on the optical circuit 710. In addition, the processor 730 is operatively coupled to the light source 720 and the detector 740 so as to perform permutations of the input states and/or output states as described above.

Mitigating Imperfections

As discussed above, one or more embodiments of the present disclosure include a method that can be used in conjunction with a method of mitigating imperfections in optical circuits. An example type of imperfection in an optical circuit is compromised parameter ranges of an optical component. For example, the extinction ratio of a beamsplitter may be specified as from 0:100 to 100:0, but the actual dynamic range of this beamsplitter may be between 5:95 and 95:5. Known methods of addressing this type of imperfection include nonlinear optimization and self-reconfiguring optics, but nonlinear optimization does not guarantee the existence of any solution and self-reconfiguring optics typically increases the footprint of the resulting optical circuit (e.g., at least by a factor of two).

In some embodiments, a method includes determining a first setting of an optical circuit including a plurality of optical components to implement a first linear transformation on a plurality of input optical modes. The first linear transformation is characterized by a first matrix. The first setting includes a first target parameter beyond a parameter range of an optical component in the plurality of optical components. The method also includes determining a second setting of the optical circuit to implement a second linear transformation on the plurality of input optical modes. The second linear transformation is characterized by a second matrix generated by permuting multiple rows or columns (e.g., two rows or two columns) of the first matrix. The second setting includes a second target parameter within the parameter range of the optical component. The method also includes configuring the optical circuit into the second setting to perform the second linear transformation on the plurality of input optical modes.

One or more methods, apparatus, and systems described herein employ an approach to mitigate imperfection in an optical circuit by reconfiguring the optical circuit to either circumvent the imperfection or use optical components affected by the imperfection in a compatible way. To mitigate the first type of imperfections (e.g., lossy modes and unresponsive optical components), an approach described herein that includes selecting the setting of some optical components (e.g., beamsplitters) such that the rest of the optical components form a new optical circuit (also referred to as a reconfigured optical circuit). The new optical circuit can be substantially similar to the original optical circuit except that the new optical circuit is configured to process a smaller number of optical modes. For the second type of imperfections (e.g., compromised parameter ranges in optical components), an approach includes permuting the input and/or output ports of the optical circuit (e.g., by relabeling the input and/or output ports) such that the permuted optical circuit is configured to implement a target transformation with a setting that is within the parameter range of every individual optical component within the permuted optical circuit. By reconfiguring the optical circuit having imperfections, the approach can be more cost effective compared to known methods because this approach neither discards the entire optical circuit nor increases the footprint of the optical circuit.

Figure 10:
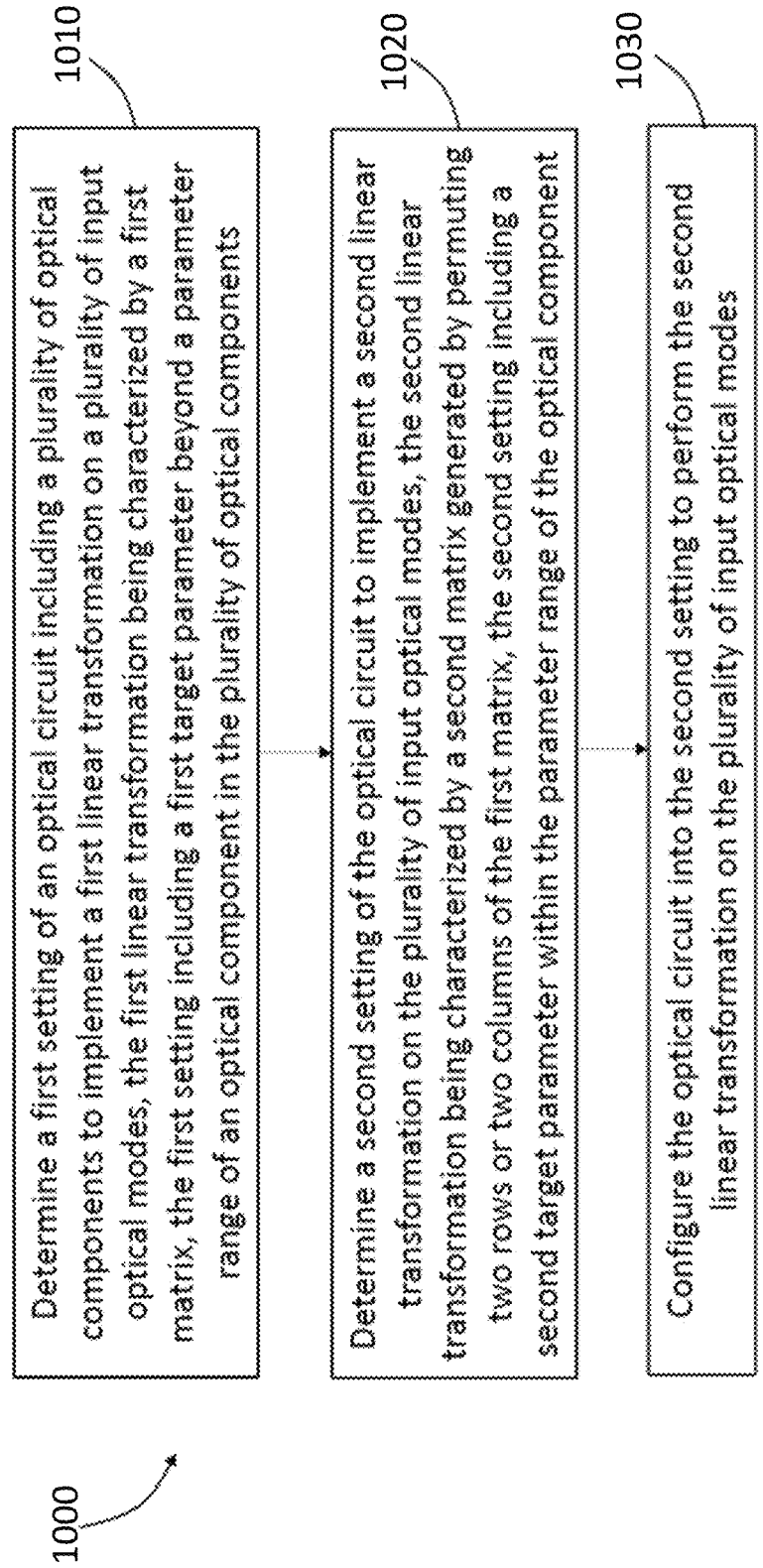
FIG. 10 is a flowchart illustrating a method of addressing optical components having a compromised parameter range, according to an embodiment.

FIG. 10 is a flowchart illustrating a method 1000 of addressing optical components having a compromised parameter range, according to an embodiment. The method 1000 includes, at 1010, determining a first setting of an optical circuit including a plurality of optical components to implement a first linear transformation on a plurality of input optical modes. The first linear transformation is characterized by a first matrix. The first setting includes a first target parameter beyond a parameter range of an optical component in the plurality of optical components.

The method 1000 also includes, at 1020, determining a second setting of the optical circuit to implement a second linear transformation on the plurality of input optical modes. The second linear transformation is characterized by a second matrix generated by permuting two rows or two columns of the first matrix. The second setting includes a second target parameter within the parameter range of the optical component. At 1030, the optical circuit is configured into the second setting to perform the second linear transformation on the plurality of input optical modes. Since the second linear transformation is only a permuted version of the first linear transformation, the results achieved by the second linear transformation can be converted into results that would have been achieved by the first linear transformation by post-processing, such as relabeling the input/output ports of the optical circuit. In other words, permuting the matrix of a linear transformation does not change the substance of the linear transformation.

In some embodiments, the step 1020 may not generate a setting that allows the optical component to operate within its parameter range. In these embodiments, the step 1020 can be repeated as many times as needed, until an appropriate setting is found.

In some embodiments, the method 1000 can be implemented by a controller connected to the optical circuit. For example, the controller can be used to find out the second setting and send a control signal to the optical circuit to implement the second setting. In addition, the controller can also be used to determine whether the second setting can be implemented by the optical circuit, i.e., whether every optical component in the optical circuit operates within its parameter range in order to implement the second setting. The controller can be further configured to relabel the input/output ports of the optical circuit. For example, the controller can update a table listing the numbering of the input/output ports saved in a memory connected to the controller.

The controller can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

In some embodiments, the optical circuit includes a network of interconnected beamsplitters. In some embodiments, the optical circuit includes a linear interferometer and the optical component that has a compromised parameter range is a beamsplitter having an extinction ratio different from its specification. For a linear interferometer, the numbering (or labeling) of light sources (also referred to as sources, such as lasers, optical parametric amplifiers, or any other appropriate light source) connected to the input ports of the linear interferometer is interchangeable amongst themselves. The numbering (or labeling) of detectors connected to the output ports of the linear interferometer is also interchangeable among themselves. In other words, any permutation of the source indices (also referred to as numbering or labeling) with each other can be performed outside the linear interferometer. Similarly, any permutation of detector indices can also be performed outside the linear interferometer. These permutations can be accounted for using classical control of the sources and classical post-processing of the detection outputs.

The flexibility of permuting the sources and detectors translates to flexibility in permuting the rows and columns of the unitary matrix implemented by the linear interferometer. Given an N×N unitary matrix U to be implemented using a linear interferometer, step 1020 in the method 1000 can be implemented as follows. First, two elements are sampled from a permutation group S(N) acting on N objects. Each element in the permutation group can represent a row or a column in the matrix. Then the permutations are applied to the rows and/or columns of the matrix U. Based on permutation, the setting of the linear interferometer (e.g., the transmission ratio of each beamsplitter in the linear interferometer) is determined. If the determined ratio of the beamsplitter at issue is still beyond the range of ratios that is achievable by the beamsplitter, the above steps are repeated with new permutations.

If, on the other hand, the determined ratio is within the range of ratios achievable by the beamsplitter, then the sources at the input ports are also permuted according to the permutation of rows in the matrix U. If the permutation is performed on the columns of the matrix, then the detectors at the output ports are permuted accordingly. With this permutation, the second linear transformation generates identical measurement outcomes compared to the first linear transformation whereas the issue of a limited extinction ratio of the beamsplitter is addressed.

In a linear interferometer configured to process N input optical modes, the number of possible permutations is N!×N!, which is usually a large number. Therefore, it is highly likely that at least one pair of permutations can result in a setting of the linear interferometer that can be implemented by the beamsplitter at issue.

The method 1000 addresses the imperfection in the optical component without deactivating any optical component in the optical circuit and therefore is highly cost effective. In these embodiments, the optical component at issue is configured into the inactive state. This approach may be used when no permutation results in a proper setting for the optical component.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    calculating a plurality of permuted matrices of an initial matrix that characterizes a linear transformation of a plurality of input states;
    determining a plurality of settings of an optical circuit based on the plurality of permuted matrices, each setting in the plurality of settings associated with an electric power, from a plurality of electric powers, consumed by the optical circuit;
    determining a selected setting of the optical circuit based on the electric power from the plurality of electric powers and consumed by the optical circuit at each setting from the plurality of settings associated with the electric power; and
    sending one or more control signals to a plurality of reconfigurable circuit portions of the optical circuit to implement the selected setting on the optical circuit.

2. The method of claim 1, wherein the initial matrix includes a unitary matrix.

3. The method of claim 1, wherein the selected setting of the optical circuit is associated with an electric power that is lowest among the plurality of electric powers consumed by the optical circuit at the plurality of settings.

4. The method of claim 1, wherein the selected setting of the optical circuit is associated with an electric power within a predetermined range of electric powers.

5. The method of claim 1, wherein the initial matrix is a first initial matrix, the selected setting is a first selected setting, and the method further comprises:
    determining a second selected setting of the optical circuit based on electric powers consumed by the optical circuit at a plurality of settings associated with a plurality of permuted matrices of a second initial matrix, the first selected setting and the second selected setting being within a predetermined range of electric powers.

6. The method of claim 1, wherein the plurality of input states includes six or less input states and calculating the plurality of permuted matrices includes calculating all possible permutations of the initial matrix to generate the plurality of permuted matrices.

7. The method of claim 1, wherein the plurality of input states includes 20 or less input states and calculating the plurality of permuted matrices includes calculating a plurality of random permutations of the initial matrix to generate the plurality of permuted matrices, the plurality of random permutations includes about 10,000 random permutations to about 100,000 random permutations.

8. The method of claim 1, wherein calculating the plurality of permuted matrices includes:

calculating a first plurality of permuted matrices corresponding to non-trivial permutations of the initial matrix;
determining an intermediate matrix from the first plurality of permuted matrices based on electric powers consumed by the optical circuit at a first plurality of settings associated with the first plurality of permuted matrices;
calculating a second plurality of permuted matrices corresponding to trivial permutations of the intermediate matrix; and
determining the selected setting of the optical circuit based on electric powers consumed by the optical circuit at a second plurality of settings associated with the second plurality of permuted matrices.

9. The method of claim 1, wherein calculating the plurality of permuted matrices includes calculating the plurality of matrices based on a genetic algorithm.

10. The method of claim 1, wherein the linear transformation of the plurality of input states includes Gaussian Boson sampling of the plurality of input states.

11. The method of claim 1, further comprising implementing the selected setting on the optical circuit to perform the linear transformation of the plurality of input states.

12. An apparatus, comprising:
an optical circuit comprising a plurality of reconfigurable circuit portions and configured in a selected setting to implement a linear transformation of a plurality of input states, the linear transformation characterized by an initial matrix, the selected setting of the optical circuit being determined by a method that includes:
calculating a plurality of permuted matrices of the initial matrix;
determining a plurality of settings of the optical circuit based on the plurality of permuted matrices, each setting in the plurality of settings associated with an electric power, from a plurality of electric powers, consumed by the optical circuit;
determining the selected setting of the optical circuit based on the electric power from the plurality of electric powers and consumed by the optical circuit at each setting from the plurality of settings associated with the electric power; and
sending one or more control signals to the plurality of reconfigurable circuit portions to implement the selected setting on the optical circuit.

13. The apparatus of claim 12, wherein the plurality of reconfigurable circuit portions includes a network of interconnected reconfigurable beam splitters, each reconfigurable beam splitter in the network of interconnected reconfigurable beam splitters including at least one variable phase shifter.

14. The apparatus of claim 12, wherein the optical circuit includes at least one ring resonator and a coupler configured to couple at least one input state from the plurality of input states into the at least one ring resonator at a variable coupling ratio.

15. The apparatus of claim 12, wherein the optical circuit includes at least one micro-electro-mechanical system (MEMS) element.

16. The apparatus of claim 12, wherein the optical circuit, at the selected setting, is configured to implement the linear transformation characterized by a unitary matrix.

17. The apparatus of claim 12, wherein the selected setting of the optical circuit is associated with an electric power that is lowest among the plurality of electric powers consumed by the optical circuit at the plurality of settings.

18. The apparatus of claim 12, wherein the selected setting of the optical circuit is associated with an electric power within a predetermined range of electric powers.

19. The apparatus of claim 12, wherein the selected setting of the optical circuit is determined by the method that includes:
calculating all possible permutations of the initial matrix to generate the plurality of permuted matrices, the plurality of input states including six or less input states.

20. The apparatus of claim 12, wherein the selected setting of the optical circuit is determined by the method that includes:
calculating a plurality of random permutations of the initial matrix to generate the plurality of permuted matrices, the plurality of random permutations includes about 10,000 random permutations to about 100,000 random permutations, the plurality of input states includes 20 or less input states.

21. The apparatus of claim 12, wherein the selected setting of the optical circuit is determined by the method that includes:
calculating a first plurality of permuted matrices corresponding to non-trivial permutations of the initial matrix;
determining an intermediate matrix from the first plurality of permuted matrices based on electric powers consumed by the optical circuit at a first plurality of settings associated with the first plurality of permuted matrices;
calculating a second plurality of permuted matrices corresponding to trivial permutations of the intermediate matrix; and
determining the selected setting of the optical circuit based on electric powers consumed by the optical circuit at a second plurality of settings associated with the second plurality of permuted matrices.

22. The apparatus of claim 12, wherein the selected setting of the optical circuit is determined by the method that includes calculating the plurality of matrices based on a genetic algorithm.

23. An apparatus, comprising:
an optical circuit configured to: (1) receive a plurality of inputs during a first time period, the plurality of inputs having a plurality of input states, and (2) send a plurality of control signals during the first time period to a plurality of reconfigurable circuit portions of the optical circuit, to linearly transform the plurality of input states based on a selected setting of the optical circuit and to produce a plurality of outputs, the linear transformation characterized by an initial matrix,
the selected setting of the optical circuit based on an electric power from a plurality of electric powers consumed by the optical circuit during a second time period at each setting in a plurality of settings that are associated with a plurality of permuted matrices of the initial matrix, the second time period before and mutually exclusive from the first time period.

24. A method, comprising:
determining a first setting of an optical circuit including a plurality of optical components to implement a first linear transformation on a plurality of input optical modes, the first linear transformation being characterized by a first matrix, the first setting including a first target parameter beyond a parameter range of an optical component in the plurality of optical components;

determining a second setting of the optical circuit to implement a second linear transformation on the plurality of input optical modes, the second linear transformation being characterized by a second matrix generated by permuting two rows or two columns of the first matrix, the second setting including a second target parameter within the parameter range of the optical component; and sending one or more control signals from a controller to a plurality of reconfigurable circuit portions of the optical circuit to configure the optical circuit into the second setting to perform the second linear transformation on the plurality of input optical modes.

25. The method of claim 24, wherein the optical circuit includes a network of interconnected beamsplitters.

26. The method of claim 24, wherein the optical circuit includes a network of interconnected beamsplitters, the optical component includes a beamsplitter in the network of interconnected beamsplitters, and the first target parameter includes a first target split ratio of the beamsplitter.

27. The method of claim 24, wherein the parameter range of the optical component is limited by an imperfection in the optical component.

28. The method of claim 24, wherein the first matrix is a unitary matrix.

29. The method of claim 24, wherein the optical circuit includes a plurality of input ports and a plurality of output ports, and the method further comprises:

relabeling the plurality of input ports or the plurality of output ports based on the rows or columns that are permutated to generate the second matrix so as to use the second setting to perform the first linear transformation.

* * * * *